(12) United States Patent
Niedert et al.

(10) Patent No.: US 10,703,345 B2
(45) Date of Patent: Jul. 7, 2020

(54) METHODS AND APPARATUS TO AUTOMATICALLY CALIBRATE ELECTRONIC TRAILER BRAKE GAIN

(71) Applicant: Ford Global Technologies, LLC, Dearborn, MI (US)

(72) Inventors: Andrew Niedert, Farmington Hills, MI (US); Anton Rogness, Dearborn, MI (US); Elliott Pearson, Shelby Township, MI (US); Joshua Rajasingh, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 347 days.

(21) Appl. No.: 15/878,008

(22) Filed: Jan. 23, 2018

(65) Prior Publication Data
US 2019/0225196 A1    Jul. 25, 2019

(51) Int. Cl.
| | | |
|---|---|---|
| *B60T 7/20* | (2006.01) | |
| *B60T 8/172* | (2006.01) | |
| *B60T 8/175* | (2006.01) | |
| *B60T 8/176* | (2006.01) | |
| *B60T 8/18* | (2006.01) | |
| *B60T 8/1755* | (2006.01) | |
| *B60T 8/17* | (2006.01) | |
| *B60T 13/66* | (2006.01) | |

(52) U.S. Cl.
CPC ............... *B60T 7/20* (2013.01); *B60T 8/172* (2013.01); *B60T 8/175* (2013.01); *B60T 8/176* (2013.01); *B60T 8/1708* (2013.01); *B60T 8/1755* (2013.01); *B60T 8/1806* (2013.01); *B60T 8/1887* (2013.01); *B60T 13/662* (2013.01); *B60T 2210/30* (2013.01)

(58) Field of Classification Search
CPC ........ B60T 7/20; B60T 13/662; B60T 8/1708; B60T 8/1755; B60T 8/1806; B60T 8/1887; B60T 8/176; B60T 8/175; B60T 8/172; B60T 2210/30
USPC .......................................................... 701/78
See application file for complete search history.

(56) References Cited

U.S. PATENT DOCUMENTS

| | | |
|---|---|---|
| 5,409,301 A | 4/1995 | Topfer et al. |
| 5,782,542 A | 7/1998 | McGrath et al. |
| 6,042,196 A | 3/2000 | Nakamura et al. |
| 6,705,684 B1 | 3/2004 | Garvey |
| 7,021,723 B1 | 4/2006 | Kaufman |
| 7,204,564 B2 | 4/2007 | Brown et al. |

(Continued)

FOREIGN PATENT DOCUMENTS

WO    9939952    8/1999

OTHER PUBLICATIONS

United States Patent and Trademark Office, "Non-Final Office Action," dated Jan. 16, 2020 in connection with U.S. Appl. No. 15/994,629, 7 pages.

*Primary Examiner* — Muhammad Shafi
(74) *Attorney, Agent, or Firm* — Ray Coppiellie; Hanley, Flight & Zimmerman, LLC (57) ABSTRACT

Methods, apparatus, systems and articles of manufacture are disclosed for automatically calibrating electronic trailer brake gain. An example apparatus includes a trailer brake gain calibrator programmed to modulate a trailer brake gain value based upon a derivative of a trailer hitch force and apply a pressure to a brake of a trailer based on the gain value.

17 Claims, 6 Drawing Sheets

(56) References Cited

U.S. PATENT DOCUMENTS

| | | | |
|---|---|---|---|
| 7,438,368 B2 | 10/2008 | Kohler et al. | |
| 8,068,019 B2 | 11/2011 | Bennie et al. | |
| 8,511,759 B2 | 8/2013 | Marsden et al. | |
| 9,278,673 B2 * | 3/2016 | Squire | B60T 17/22 |
| 9,290,185 B2 | 3/2016 | Hall | |
| 9,321,440 B2 | 4/2016 | Perlick et al. | |
| 9,440,627 B2 | 9/2016 | Kurtovic et al. | |
| 9,475,470 B2 | 10/2016 | Maitlen | |
| 9,481,346 B2 | 11/2016 | Morselli et al. | |
| 2005/0006946 A1 | 1/2005 | Traechtler et al. | |
| 2008/0143179 A1 | 6/2008 | Rutherford | |
| 2008/0172163 A1 * | 7/2008 | Englert | B60T 7/20 |
| | | | 701/83 |
| 2013/0124058 A1 * | 5/2013 | Perlick | B60T 8/1708 |
| | | | 701/70 |
| 2014/0046566 A1 * | 2/2014 | Maitlen | B60T 8/1701 |
| | | | 701/70 |
| 2015/0353063 A1 * | 12/2015 | Tuhro | B60T 7/20 |
| | | | 701/70 |
| 2018/0009421 A1 | 1/2018 | Albright et al. | |
| 2018/0079395 A1 * | 3/2018 | Cekola | B60T 13/662 |
| 2018/0215358 A1 * | 8/2018 | Hall | B60T 8/1887 |
| 2019/0366989 A1 | 12/2019 | James et al. | |

\* cited by examiner

METHODS AND APPARATUS TO AUTOMATICALLY CALIBRATE ELECTRONIC TRAILER BRAKE GAIN

FIELD OF THE DISCLOSURE

This disclosure relates generally to vehicles and, more particularly, to automatically calibrating electronic trailer brake gain.

BACKGROUND

In recent years, trailers to be pulled by consumer vehicles have begun to implement electronic braking systems. Such electronic braking systems allow for greater control of the magnitude of braking force applied by the trailer brakes through a trailer brake gain that is controlled by a user of the vehicle. It is desirable for this gain to be adjusted to an optimal level because a gain that is too high (i.e., the magnitude of braking force applied by the trailer brakes is too high) can affect control of the trailer, and a gain that is too low (i.e., the magnitude of braking force applied by the trailer brakes is too low) will require extra braking force from the brakes of the vehicle, causing unnecessary wear on the vehicle brakes.

SUMMARY

An apparatus for automatically calibrating electronic trailer brake gain is disclosed herein. An example apparatus includes a hitch force derivative calculator to calculate a derivative of a hitch force of a trailer coupled to a vehicle, a gain adjustment manager to adjust a gain value based upon the derivative of the hitch force, and a brake pressure applicator to apply a pressure to a brake of the trailer based on the gain value.

Another example apparatus includes a trailer brake gain calibrator programmed to modulate a trailer brake gain value based upon a derivative of a trailer hitch force and apply a pressure to a brake of a trailer based on the gain value.

An example method includes calculating a derivative of hitch force, adjusting a gain value based upon the derivative of the hitch force, and modulating a pressure applied to a trailer brake based upon the gain value.

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

DETAILED DESCRIPTION

Many modern vehicles and trailers implement electronic braking systems. Such electronic braking systems allow for greater control of the magnitude of braking force applied by the trailer brakes through a trailer brake gain that is controlled by a user of the vehicle. It is desirable for this gain to be adjusted to an optimal level because too much trailer braking force can affect control of the trailer, and too littler trailer braking force will require extra braking force from the brakes of the vehicle, causing unnecessary wear on the vehicle brakes.

Conventional electronic trailer braking systems require a user of the vehicle to manually calibrate (i.e., adjust) the trailer brake gain to the optimal level. Adjusting the trailer brake gain to the optimal level generally includes manually determining the trailer brake gain value at which the trailer brakes lock up (i.e., wheels of the trailer begin sliding on the driving surface) and slightly decreasing the trailer brake gain from this value.

This procedure requires a significant amount of time investment by the user of the vehicle. It also requires a large, empty space to complete the calibration and for the trailer brakes to be locked up, applying unnecessary wear to the trailer brakes and trailer tires. In addition, the trailer brake gain would ideally be recalibrated any time the load in the trailer changes or any time driving conditions (i.e., temperature, precipitation, driving surface condition, etc.) change. However, this is an onerous task for the user of the vehicle when the calibration is required to be completed manually. As such, methods and apparatus to automatically adjust trailer brake gain are needed.

Examples disclosed herein automatically calibrate (i.e., adjust) the trailer brake gain to an optimal value. More specifically, the examples detect whether the trailer brake gain needs to be calibrated and, in response to determining the trailer brake gain does need to be calibrated, modulate the trailer brake gain based upon a change in hitch force in the longitudinal direction (i.e., the direction of travel of the vehicle and the trailer) with respect to time (i.e., the derivative of hitch force in the longitudinal direction).

As will be set forth in greater detail below, the examples disclosed herein provide a trailer brake gain calibrator to automatically calibrate the trailer brake gain to an optimal value.

In some examples, the trailer brake gain calibrator determines whether trailer brake gain calibration is necessary based upon data from at least one of anti-lock brake data, traction control data, vehicle stability control data, climate data, gear shift data, hitch force data, vehicle speed data, or key cycle data. For example, the trailer brake gain calibrator can determine that trailer brake gain calibration is needed based upon temperature data showing that the outdoor temperature is below freezing (e.g., below 32 degrees Fahrenheit, 0 degrees Celsius, etc.). In another such example, the trailer brake gain calibration can determine that trailer brake gain calibration is needed based upon moisture data showing that it is raining.

In response to determining that trailer brake gain calibration is needed, the trailer brake gain calibrator is further to initialize the trailer brake calibration routine. The trailer brake calibration routine, in some examples, includes applying a brake pressure to the electronic brakes of the trailer coupled to the vehicle based on an initial trailer brake gain.

The trailer brake gain calibrator is further to receive a hitch force from a hitch force sensing system, the hitch forced based upon at least a level of braking applied by the vehicle braking system and the trailer braking system. In some examples, the hitch force is further to be stored for later retrieval.

Additionally, the trailer brake gain calibrator is further to determine a derivative of the hitch force with respect to time (e.g., dHf/dT). For example, dHf/dT can be determined by calculating the difference between two hitch forces stored for retrieval, wherein the two hitch forces occurred at different times, and dividing the calculated difference between hitch forces by the time difference between the two hitch forces. In some examples, dHf/dT is further to be stored for later retrieval.

Based upon the calculated value of dHf/dT, the trailer brake gain calibrator is further to determine whether the trailer brake gain is to be increased or decreased. In some examples, the trailer brake gain calibrator is further to determine whether the absolute value of dHf/dT increased from a previous value of the absolute value of dHf/dT.

In response to determining the absolute value of dHf/dT increased, the trailer brake gain calibrator is to increase the trailer brake gain, modulate the force applied to the trailer brakes based upon this gain, and repeat the calibration routine. Alternatively, in response to determining the absolute value of dHf/dT decreased, the trailer brake gain calibrator is further to decrease the trailer brake gain, modulate the force applied to the trailer brakes based upon this gain, and determine that the trailer brake gain is properly calibrated.

As will be discussed in greater detail below in accordance with the teachings of this disclosure, the trailer brake gain calibrator can have various configurations that may depend on a type of vehicle and/or trailer coupled to the vehicle. In examples disclosed herein, these configurations can be changed or altered to ensure the trailer brake gain calibrator properly diagnoses the need for a trailer brake gain calibration and to calibrate the trailer gain value to a proper level.

Figure 1:
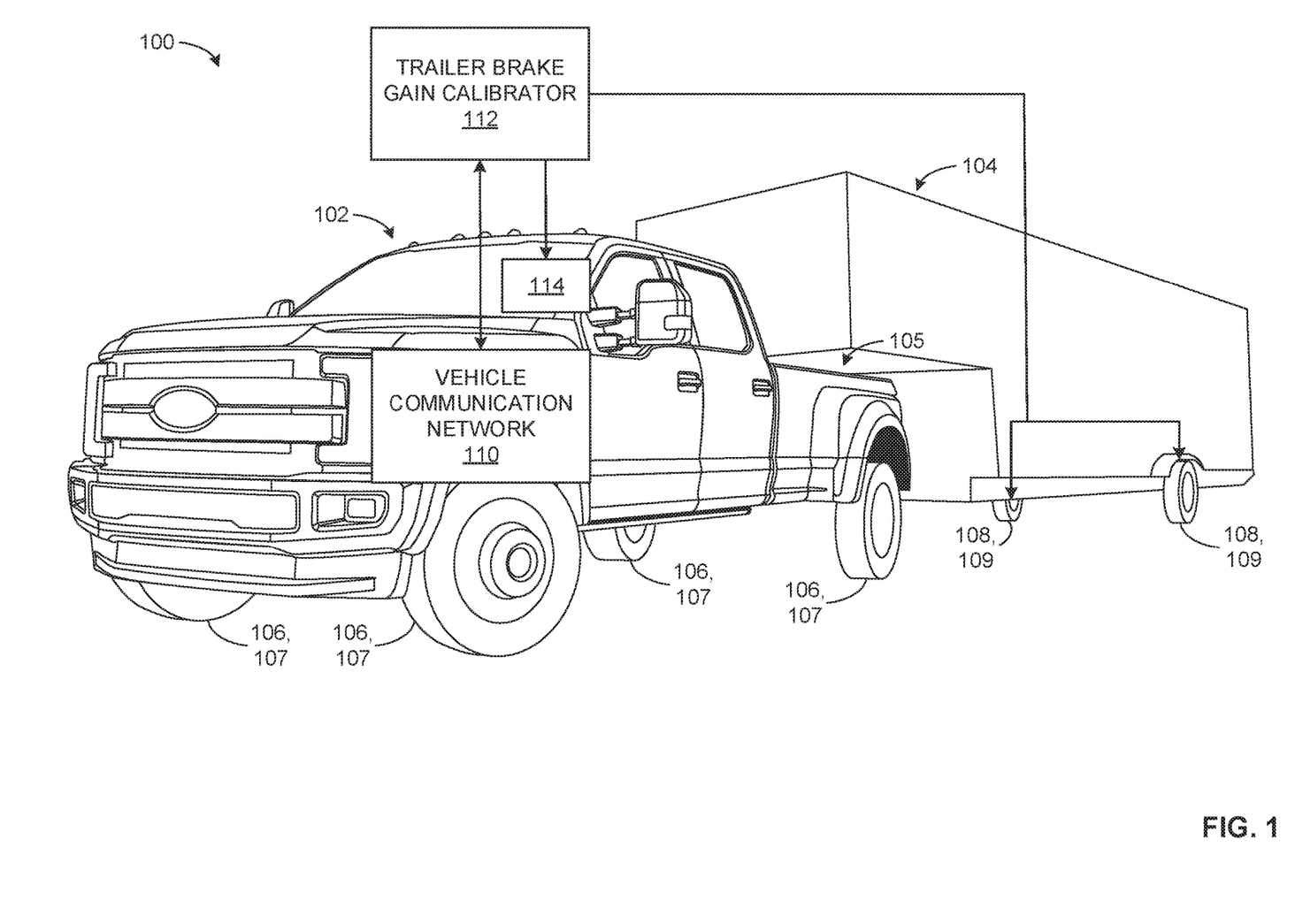
FIG. 1 illustrates an example vehicle and an example trailer coupled to the vehicle including a vehicle communication network and a trailer brake gain calibrator by which the examples disclosed herein can be implemented.

Turning to FIG. 1, an example environment of use 100 includes a vehicle 102, the vehicle 102 capable of towing a trailer 104. In the illustrated example, the trailer 104 is coupled to the vehicle 102 by an example trailer hitch 105. The trailer 104 and the contents thereof can be any weight towable by the vehicle 102. For example, if the towing capacity of the vehicle 102 is 10,000 lbs., the trailer 104 and the contents thereof can be any weight less than or equal to 10,000 lbs. (e.g., 9,000 lbs., 3,000 lbs., etc.). Additionally, the weight of the trailer 104 and the contents thereof can vary with time. For example, if the vehicle 102 is used to deliver goods, the weight of the trailer 104 and the contents thereof may decrease after a delivery is complete.

The vehicle 102 further includes one or more wheels 106. In the illustrated example of FIG. 1, the vehicle 102 has four wheels 106. Additionally, one or more of the wheels 106 may include a brake system 107. In the illustrated example of FIG. 1, each of the wheels 106 includes the brake system 107. In some examples, the brake systems 107 may include drum and/or disc brakes. Additionally or alternatively, the brake systems 107 may include any additional and/or different mechanisms capable of reducing the speed of the vehicle 102.

Similar to the vehicle 102, the trailer 104 includes one or more wheels 108. In the illustrated example of FIG. 1, the trailer 104 includes two wheels 108. Additionally, one or more of the wheels 108 may include a brake system 109. In the illustrated example of FIG. 1, each of the wheels 108 includes the brake system 109. The brake systems 109 may include drum and/or disc brakes.

In some examples, a braking force applied by the braking systems 109 may be electronically controlled. In such examples, the braking force applied may be modulated automatically by a processor or by a user of the vehicle 102. Additionally or alternatively, a braking force applied by the braking systems 109 may be pneumatically and/or hydraulically controlled. In such examples, the braking force applied is directly modulated by a loading applied to the vehicle 102 by the trailer 104.

Figure 2:
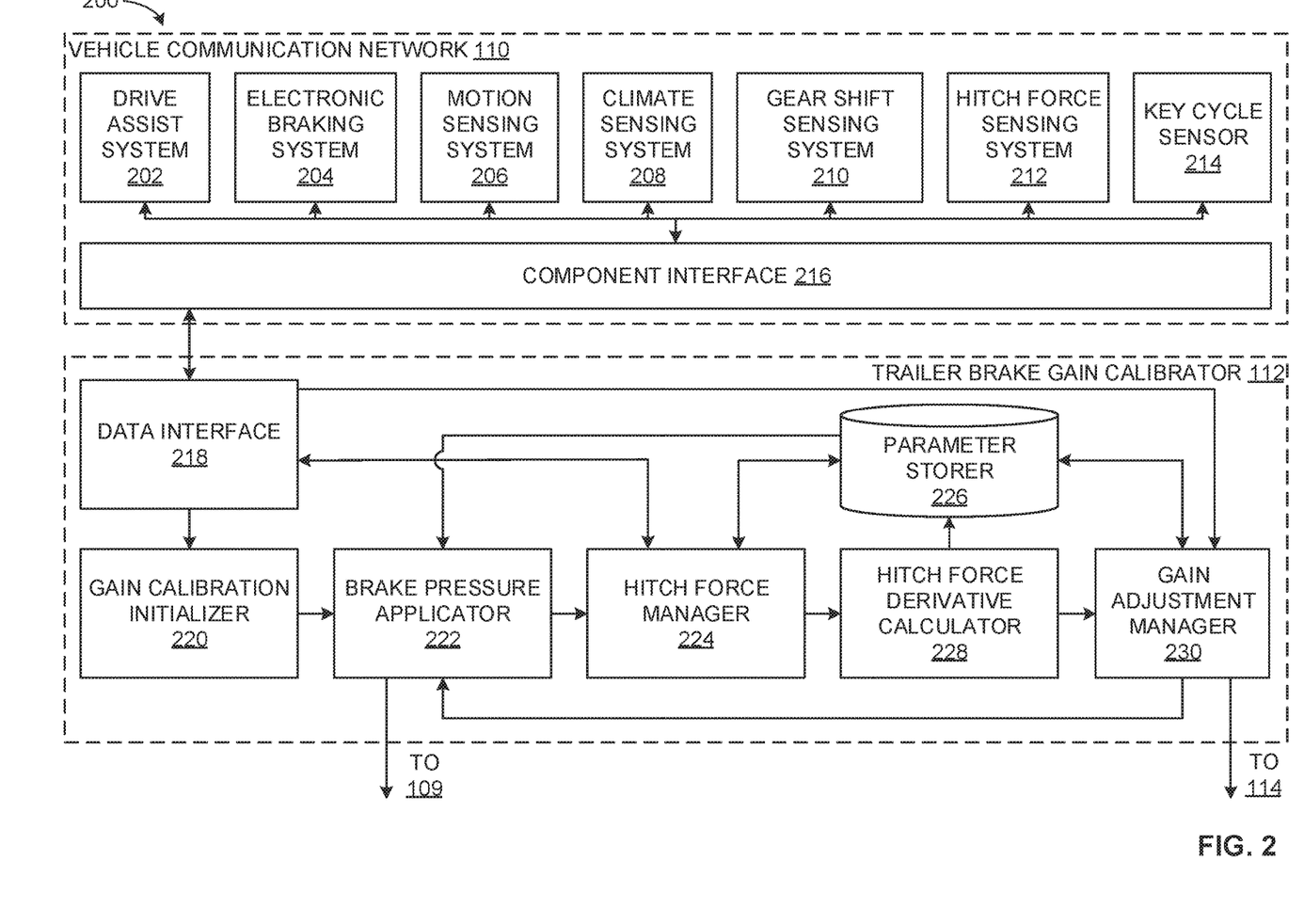
FIG. 2 is a block diagram further detailing the vehicle communication network and the trailer brake gain calibrator of FIG. 1 by which the examples disclosed herein can be implemented.

The example vehicle 102 further includes a vehicle communication network 110 and a trailer brake gain calibrator 112, each of the vehicle communication network 110 and the trailer brake gain calibrator 112 described in further detail in conjunction with FIG. 2, to enable calibration of the trailer brake gain.

The example vehicle 102 further includes an example user notifier 114. In some examples, the user notifier 114 is capable of alerting a user of the vehicle 102 to parameters and/or data from at least one of the vehicle communication network 110 or the trailer brake gain calibrator 112. The user notifier 114 may be any device capable of providing a notification to the user of the vehicle 102. For example, the user notifier 114 may be a visual display capable of visually displaying parameters and/or data. Additionally or alternatively, the user notifier 114 may be an audio system capable of audibly reciting parameters and/or data. In some examples, the parameters and/or data distributed by the user notifier 114 may include at least one of a trailer brake gain calibration routine complete notification, a calibrated trailer brake gain, a hitch force, etc.

FIG. 2 is a block diagram of an example implementation 200 of the example vehicle communication network 110 and the example trailer brake gain calibrator 112 of FIG. 1. The vehicle communication network 110 can, in some examples such as the illustrated example of FIG. 2, include an example drive assist system 202, an example electronic braking system 204, an example motion sensing system 206, an example climate sensing system 208, an example gear shift sensing system 210, an example hitch force sensing system 212, an example key cycle sensor 214, and an example component interface 216.

Additionally, in some examples such as the illustrated example of FIG. 2, the trailer brake gain calibrator 112 can include an example data interface 218, an example gain calibration initializer 220, an example brake pressure applicator 222, an example hitch force manager 224, an example parameter storer 226, an example hitch force derivative calculator 228, and an example gain adjustment manager 230.

Returning to the vehicle communication network 110, the drive assist system 202, included in or otherwise implemented by the vehicle communication network 110, is capable of distributing data from at least one of an anti-lock brake system, a traction control system, and a vehicle stability control system implemented by the vehicle 102. In some examples, the drive assist system 202 distributes data including the rotational speed of one or more of the wheels 106 of FIG. 1. Additionally or alternatively, the drive assist system 202 can distribute a notification when one or more of the wheels 106 is/are skidding (e.g., locked up, not rotating, etc.).

The example electronic braking system 204, included in or otherwise implemented by the vehicle communication network 110, is capable of distributing data related to the wheels 108 and the braking systems 109 of the trailer 104.

In some examples, the data distributed can include the rotational speed of the wheels 108, a notification when one or more of the wheels 108 is/are locked up (e.g., skidding, not rotating, etc.), and/or a pressure applied by the braking systems 109. Additionally or alternatively, the electronic braking system 204 can distribute a notification that the trailer 104 is coupled to the vehicle 102 when data for at least one of the wheels 108 and/or the braking systems 109 is received.

The motion sensing system 206, included in or otherwise implemented by the vehicle communication network 110, is capable of determining and distributing one or more motion parameters of the vehicle 102. In some examples, the motion parameters can include at least one of the position, the velocity, and/or the acceleration of the vehicle 102.

The climate sensing system 208, included in or otherwise implemented by the vehicle communication network 110, is capable of determining and distributing climate parameters experienced by the vehicle 102. In some examples, the climate parameters can include the exterior temperature and/or the precipitation status (e.g., no precipitation, light rain, heavy rain, light snow, etc.) at the location of the vehicle 102. In some examples, the climate parameters may be determined by sensors included in the vehicle 102. Additionally or alternatively, the climate parameters may be determined based upon GPS location data for the vehicle 102 and climate parameters known for the GPS determined location.

The gear shift sensing system 210, included in or otherwise implemented by the vehicle communication network 110, is capable of determining and distributing the gear selection status of the vehicle 102. In some examples, the gear selection status may include one of park, drive, reverse, and/or neutral. Additionally, when the vehicle 102 is in drive, the gear selection status may further include the drive gear (e.g., first gear, second gear, fifth gear, etc.) of the vehicle 102.

The hitch force sensing system 212, included in or otherwise implemented by the vehicle communication network 110, is capable of determining and distributing a loading (e.g., force and/or moment) at the trailer hitch 105. In some examples, the loading at the trailer hitch 105 includes at least one of a longitudinal hitch force (e.g., force in the direction of travel of the vehicle 102 and the trailer 104), a vertical hitch force (e.g., force perpendicular to a travel surface due to gravitational loading based on the weight of the trailer 104), and a transverse hitch force (e.g., force perpendicular to the direction of travel of the vehicle 102 and the trailer 104). Further, in the longitudinal direction, a positive longitudinal hitch force denotes the trailer 104 applying a load to the vehicle 102. Conversely, a negative hitch force denotes the vehicle 102 applying a load to the trailer 104.

The key cycle sensor 214, included in or otherwise implemented by the vehicle communication network 110, is capable of determining when the vehicle 102 is started (e.g., a key is used to start/cycle the vehicle 102) and distributing a notification when the vehicle 102 is started.

The component interface 216, included in or otherwise implemented by the vehicle communication network 110, is capable of receiving data from at least one of the drive assist system 202, the electronic braking system 204, the motion sensing system 206, the climate sensing system 208, the gear shift sensing system 210, the hitch force sensing system 212, and the key cycle sensor 214. Additionally, the component interface 216 may determine a time at which data was received and append a timestamp to the data based upon the reception time. The component interface 216 is additionally capable of distributing data to the trailer brake gain calibrator 112 and/or receiving data from the trailer brake gain calibrator 112.

The data interface 218, included in or otherwise implemented by the trailer brake gain calibrator 112, is capable of receiving data from and/or distributing data to the component interface 216 included in the vehicle communication network 110. The data interface 218 is further capable of distributing received data to at least one of the gain calibration initializer 220, the hitch force manager 224, and/or the gain adjustment manager 230. For example, the data interface 218 may distribute data from the climate sensing system 208 (e.g., temperature data, precipitation data, etc.) to the gain calibration initializer 220, data from the hitch force sensing system 212 to the hitch force manager 224, and/or data from the motion sensing system 206 to the gain adjustment manager 230.

The gain calibration initializer 220, included in or otherwise implemented by the trailer brake gain calibrator 112, is capable of determining whether it is desired to calibrate a trailer brake gain value. For example, the gain calibration initializer 220 may determine it is desired to calibrate the trailer brake only if the trailer 104 is coupled to the vehicle 102 as determined by the electronic braking system 204, the velocity of the vehicle is within a threshold (e.g., greater than 1 mile per hour and less than 30 miles per hour) as determined by the motion sensing system 206, and the vehicle 102 is in drive as determined by the gear shift sensing system 210.

In some examples, the gain calibration initializer 220 may further determine it is desired to calibrate the trailer brain gain value based upon an input from a user of the vehicle 102. Additionally or alternatively, the gain calibration initializer 220 may determine it is desired to calibrate the trailer brake gain value based upon data (e.g., parameters) received from the vehicle communication network 110. In some examples, it is desired to calibrate the trailer brake gain value when there is a change in one of the parameters received from the vehicle communication network 110.

For example, it may be desired to calibrate the trailer brake gain value when at least one of the drive assist system 202 engages, when the electronic braking system 204 distributes a notification that the one or more of the wheels 108 locked up, when the climate sensing system distributes a notification a climate has changed (e.g., it started raining, temperature dropped below freezing (e.g., below 32 degrees Fahrenheit), etc.), when the hitch force sensing system 212 detects a longitudinal hitch force above a threshold, and/or when the key cycle sensor 214 distributes a notification that the vehicle 102 was started.

The gain calibration initializer 220, in response to determining it is desired to calibrate the trailer brake gain value, is further to determine an initial value of trailer brake gain to distribute to the brake pressure applicator 222. In some examples, the gain calibration initializer 220 may determine an initial trailer brake gain value based upon a previously calibrated trailer brake gain value. Additionally or alternatively, the gain calibration initializer 220 may select a nominal value for the initial trailer brake gain value. For example, the gain calibration initializer 220 may select a midpoint of the full range of possible trailer brake gains (e.g., a gain value of 5 on a range of 1 to 9).

The brake pressure applicator 222, included in or otherwise implemented by the trailer brake gain calibrator 112, is capable of applying a braking pressure to the braking systems 109 based upon a received gain. In some examples, the brake pressure applicator 222 may receive an initial trailer brake gain from the gain calibration initializer 220. Additionally or alternatively, the brake pressure applicator 222 may receive a trailer brake gain from the gain adjustment manager 230. In some examples, the trailer brake gain received from the gain adjustment manager 230 may be a calibrated trailer brake gain.

In some examples, the brake pressure applicator 222 may determine the braking pressure to apply directly based upon the received trailer brake gain. Additionally or alternatively, the brake pressure applicator 222 may utilize additional equations and/or parameters in addition to the received trailer rake gain to determine the braking pressure to apply. Further, upon application of the braking pressure, the brake pressure applicator 222 is to notify the hitch force manager 224 of the applied braking pressure.

The hitch force manager 224 is included in or otherwise implemented by the trailer brake gain calibrator 112. In response to receiving a notification from the brake pressure applicator 222 that the braking pressure was applied, the hitch force manager 224 is to request the longitudinal hitch force (e.g., a hitch force) and a timestamp associated with the hitch force from the data interface 218. In response to receiving the hitch force and associated timestamp from the data interface 218, the hitch force manager 230 is to distribute the hitch force and timestamp to the parameter storer 226 and to request a hitch force occurring at a prior time (e.g., a previous hitch force) and an associated timestamp from the parameter storer 226. Upon receiving the previous hitch force and associated timestamp from the parameter storer 226, the hitch force manager 224 is further to distribute each of the hitch force and associated timestamp in addition to the previous hitch force and the associated timestamp to the hitch force derivative calculator 228.

The parameter storer 226, included in or otherwise implemented by the trailer brake gain calibrator 112, is capable of storing at least one of hitch forces, timestamps of hitch forces, derivatives of hitch forces with respect to time, second derivatives of hitch forces with respect to time, and/or trailer brake gain values. The parameter storer 226 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The parameter storer 226 may additionally or alternatively be implemented by one or more double data rate (DDR) memories, such as DDR, DDR2, DDR3, mobile DDR (mDDR), etc. The parameter storer 226 may additionally or alternatively be implemented by one or more mass storage devices such as hard disk drive(s), compact disk drive(s), digital versatile disk drive(s), etc. While in the illustrated example the parameter storer 226 is illustrated as a single database, the parameter storer 226 may be implemented by any number and/or type(s) of databases. Further, the parameter storer 226 may be located in the vehicle 102 or at a central location outside of the vehicle 102. Furthermore, the data stored in the parameter storer 226 may be in any data format such as, for example, binary data, comma delimited data, tab delimited data, structured query language (SQL) structures, etc.

The hitch force derivative calculator 228, included in or otherwise implemented by the trailer brake gain calibrator 112, is capable of calculating a time-based derivative of longitudinal hitch force, the longitudinal hitch force calculated for the trailer hitch 105 that couples the vehicle 102 to the trailer 104. In some examples, the time-based derivative of longitudinal hitch force is calculated based upon the hitch force and associated timestamp in addition to the previous hitch force and associated timestamp received from the hitch force manager 224.

Further, in some such examples, the hitch force derivative calculator 228 is to calculate the time-based derivative of hitch force by calculating the difference between the received hitch force and the received previous hitch force and dividing this difference by the time difference (e.g., a period of time) between the respective timestamps associated with the hitch forces. In some examples, the hitch force derivative calculator 228 may additionally or alternatively calculate an average derivative of hitch force by averaging two or more derivative of hitch force values.

Additionally or alternatively, the hitch force derivative calculator 228 may be further to calculate a second derivative of hitch force (e.g., the change in the derivative of hitch force with respect to time) utilizing two calculated derivatives of hitch force. Additionally or alternatively, the hitch force derivative calculator 228 may calculate the absolute value (e.g., a magnitude of the value) of the derivative of hitch force. Additionally, the hitch force derivative calculator 228 is further to distribute calculated values (e.g., the derivative of hitch force, the second derivative of hitch force, the average derivative of hitch force, absolute value of the derivative of hitch force, etc.) to at least one of the parameter storer 226 and the gain adjustment manager 230.

The gain adjustment manager 230, included in or otherwise implemented by the trailer brake gain calibrator 112, is capable of utilizing calculated values received from the hitch force derivative calculator 228 to adjust (e.g., modulate) the trailer brake gain. Additionally, the gain adjustment manager 230 is further capable of determining if the status of the vehicle 102 is such that it remains appropriate to modulate the trailer brake gain. In some examples, determining the appropriateness to modulate the trailer brake gain further includes at least one of, based on data received from the data interface 218, determining whether the vehicle 102 is in drive based upon data from the gear shift sensing system 210 and whether the velocity of the vehicle 102 is within a threshold (e.g., the vehicle 102 is traveling faster than 5 miles per hour and less than 25 miles per hour) based on data from the motion sensing system 206.

In response to determining it appropriate to continue calibrating the trailer brake gain, the gain adjustment manager 230 is further to determine whether the absolute value of the derivative of hitch force received from the hitch force derivative calculator 228 increased or decreased from a previously recorded value, the previously recorded value retrieved from the parameter storer 226.

In response to the absolute value of the derivative of hitch force increasing, the gain adjustment manager 230 is further to increase the trailer brake gain value. In some examples, the trailer brake gain value is increased based upon the value of the increase of the absolute value of the derivative of hitch force. Additionally or alternatively, the trailer brake gain value is increased by a static value. Conversely, in response to the absolute value of the derivative of hitch force decreasing, the gain adjustment manager 230 is further to decrease the trailer brake gain value and set the decreased trailer brake gain value as the calibrated trailer brake gain value. In some examples, the trailer brake gain value is decreased based upon the value of the decrease of the absolute value of the derivative of hitch force. Additionally or alternatively, the trailer brake gain value is decreased by a static value.

In some examples, the second derivative of hitch force may be used to modulate the trailer brake gain. In such examples, the gain adjustment manager 230 is to increase the trailer brake gain when the second derivative of hitch force is positive and decrease the trailer brake gain value when the second derivative of hitch force is negative.

In response to calculating the modulated trailer brake gain value, the gain adjustment manager 230 is further to distribute the modulated trailer brake gain value in addition to a status notification (e.g., the modulated trailer brake gain value is a calibrated trailer brake gain value or the modulated trailer brake gain value requires additional calibration (e.g., modulation)) to the brake pressure applicator 222. Additionally, in response to determining the trailer brake gain is calibrated, the gain adjustment manager 230 is further to distribute the calibrated gain and a gain calibrated notification to the user notifier 114.

While an example manner of implementing the trailer brake gain calibrator 112 of FIG. 1 is illustrated in FIG. 2, one or more of the elements, processes and/or devices illustrated in FIG. 2 may be combined, divided, re-arranged, omitted, eliminated and/or implemented in any other way. Further, the example data interface 218, the example gain calibration initializer 220, the example brake pressure applicator 222, the example hitch force manager 224, the example hitch force derivative calculator 228, the example gain adjustment manager 230, and/or, more generally, the example trailer brake gain calibrator 112 of FIG. 2 may be implemented by hardware, software, firmware and/or any combination of hardware, software and/or firmware. Thus, for example, any of the example data interface 218, the example gain calibration initializer 220, the example brake pressure applicator 222, the example hitch force manager 224, the example hitch force derivative calculator 228, the example gain adjustment manager 230, and/or, more generally, the example trailer brake gain calibrator 112 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data interface 218, the example gain calibration initializer 220, the example brake pressure applicator 222, the example hitch force manager 224, the example hitch force derivative calculator 228, and/or the example gain adjustment manager 230 is/are hereby expressly defined to include a non-transitory computer readable storage device or storage disk such as a memory, a digital versatile disk (DVD), a compact disk (CD), a Blu-ray disk, etc. including the software and/or firmware. Further still, the example trailer brake gain calibrator 112 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
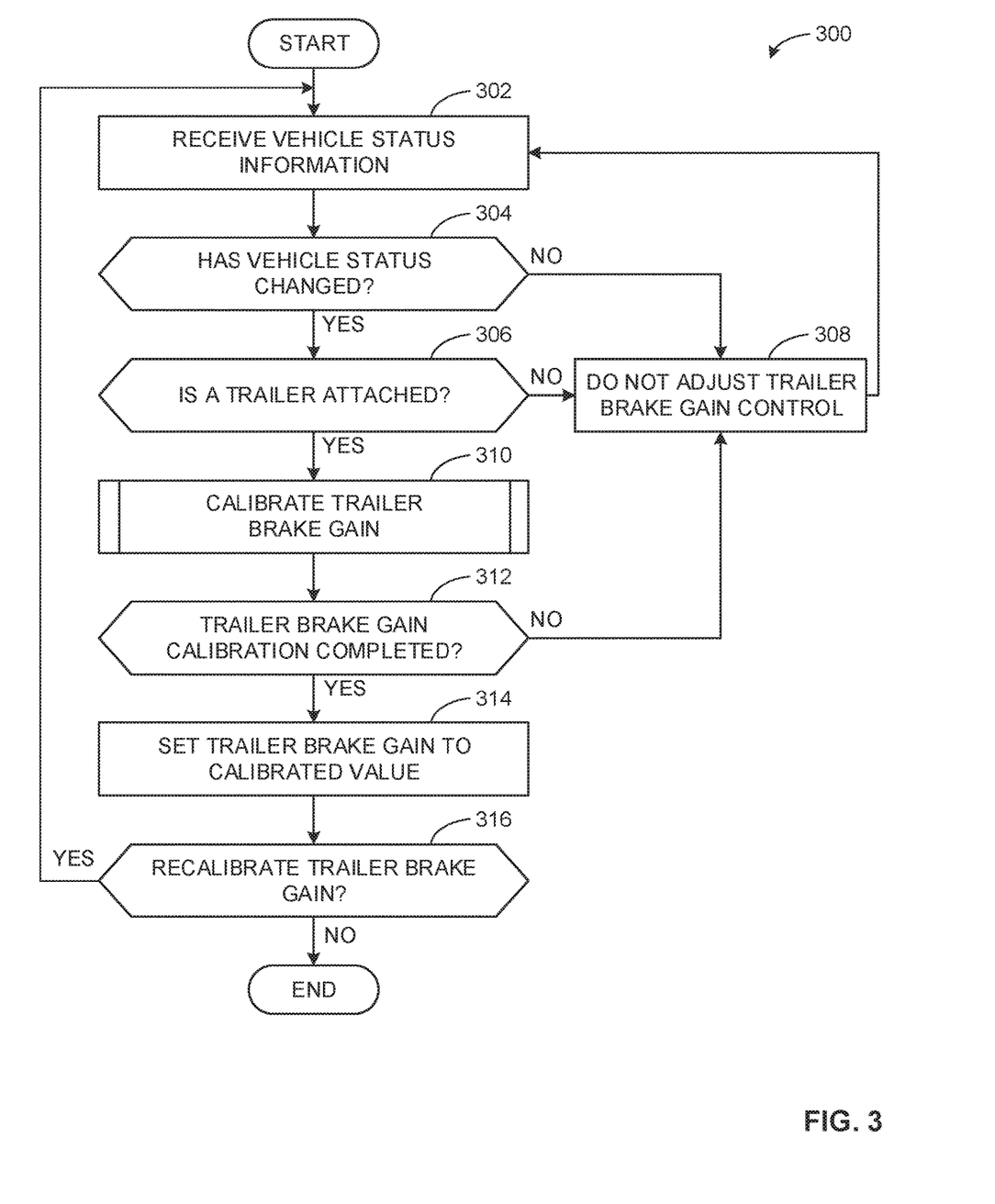
FIGS. 3-5 are flowcharts representative of example methods that may be performed using the trailer brake gain calibrator of FIGS. 1 and/or 2 to calibrate a trailer brake gain based on a trailer hitch force.
Figure 4:
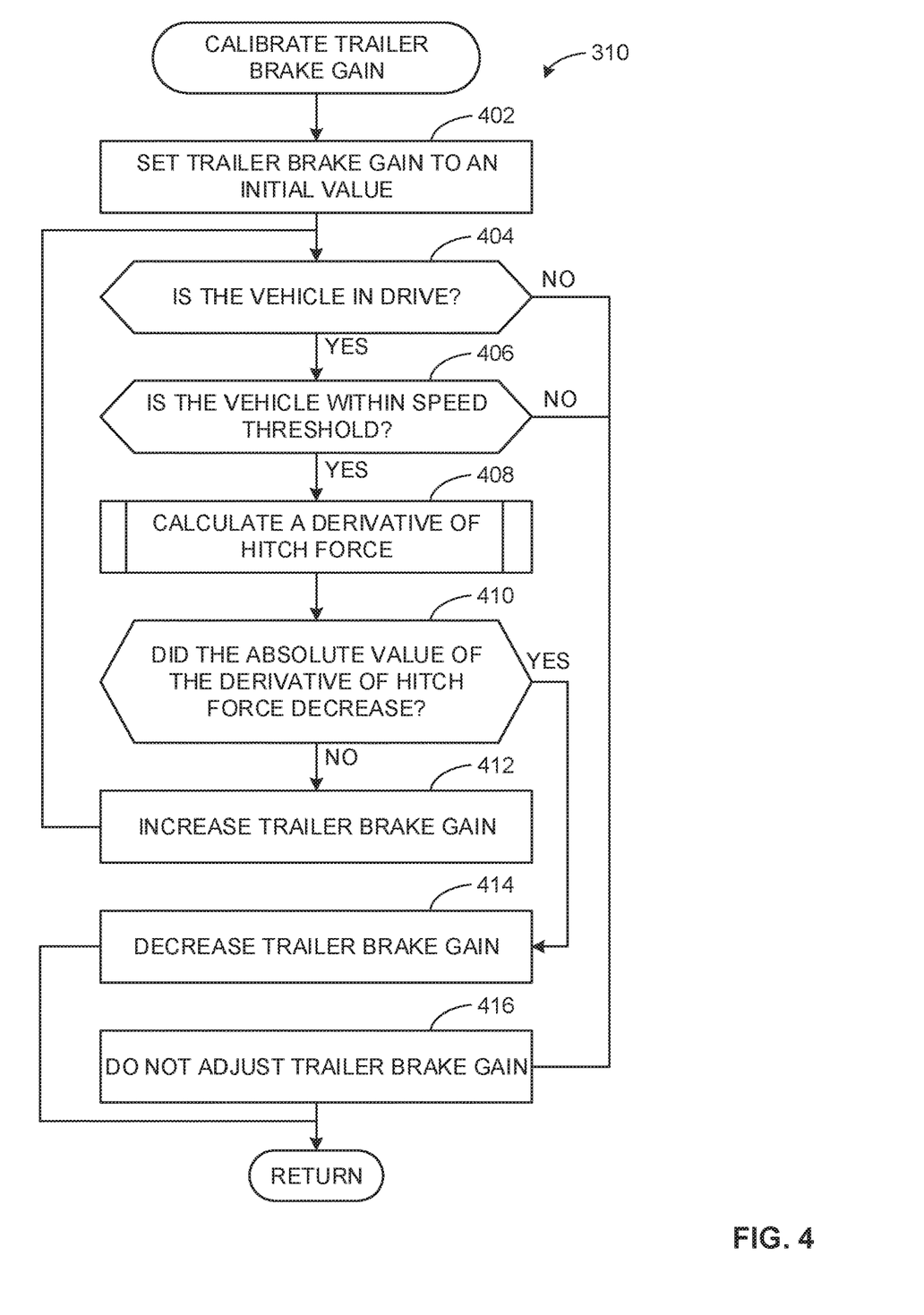
Figure 5:
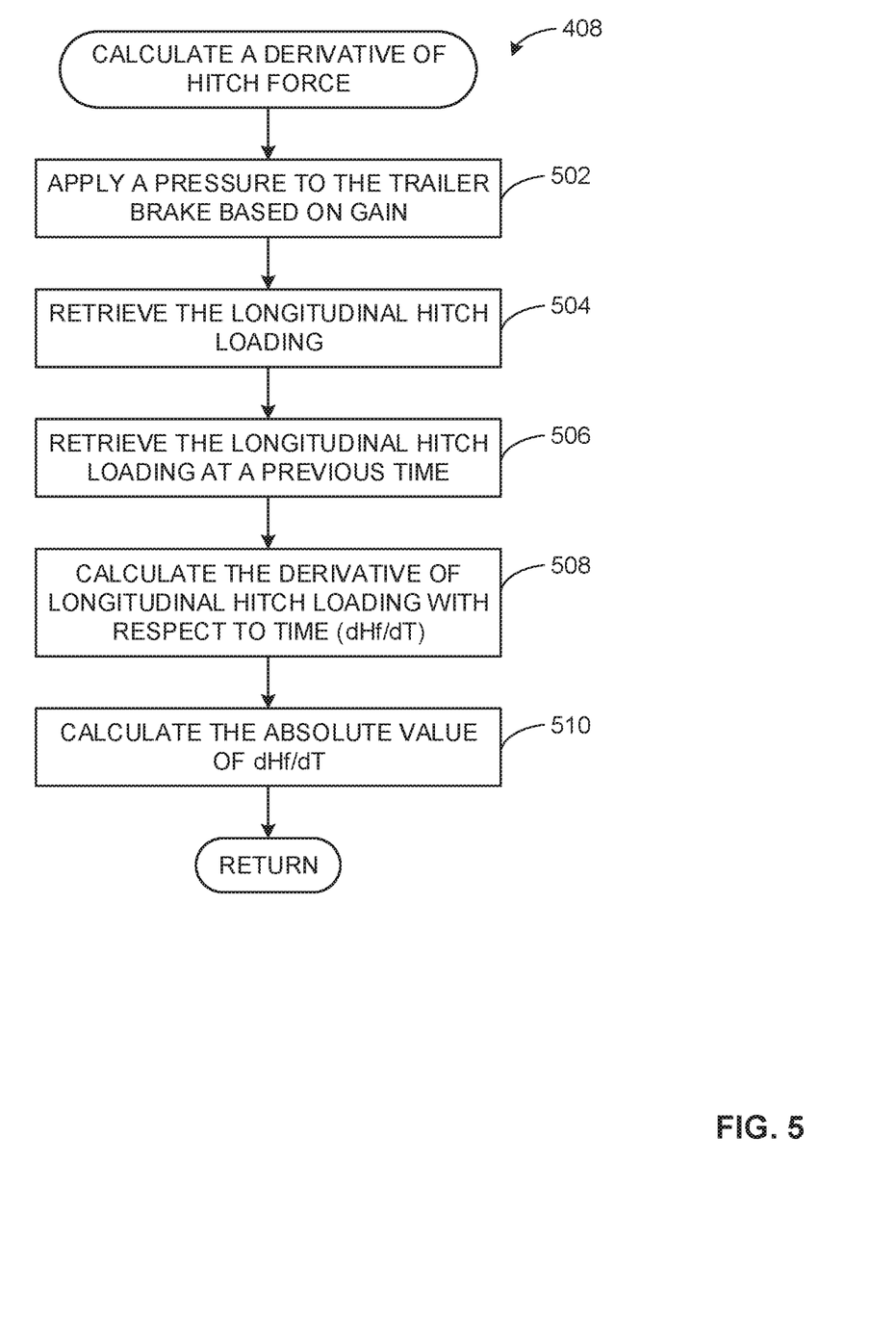

Flowcharts representative of example methods for implementing the trailer brake gain calibrator 112 of FIG. 2 are shown in FIGS. 3-5. In these examples, the method(s) may be implemented using machine readable instructions comprising a program for execution by a processor such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowcharts illustrated in FIGS. 3-5, many other methods of implementing the example trailer brake gain calibrator 112 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 3-5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

The example method 300 of FIG. 3 begins at block 302. At block 302, the example data interface 218 receives vehicle status information from at least one of the example drive assist system 202, the example electronic braking system 204, the example motion sensing system 206, the example climate sensing system 208, the example gear shift sensing system 210, the example hitch force sensing system 212, and/or the example key cycle sensor 214 via the example component interface 216.

At block 304, the example gain calibration initializer 220 utilizes the vehicle status information received at block 602 to determine whether the status of the vehicle 102 and/or the trailer 104 coupled to the vehicle 102 has changed. In response to determining the status of at least one of the vehicle 102 and/or the trailer 104 has changed, processing proceeds to block 306. Alternatively, in response to determining the status of both the vehicle 102 and the trailer 104 has not changed, processing proceeds to block 308.

At block 306, the gain calibration initializer 220 determines if the trailer 104 is attached to the vehicle 102. In some examples, the gain calibration initializer 220 makes this determination based upon a notification received from the electronic braking system 204, included in the vehicle communication network 110. In response to determining the trailer 104 is attached (e.g., coupled) to the vehicle 102, processing proceeds to block 310. Alternatively, in response to determining the trailer 104 is not attached to the vehicle 102, processing proceeds to block 308.

At block 308, the gain adjustment manager 230 determines the trailer brake gain is not to be adjusted and the trailer brake gain is to remain equal to a previously determined/calibrated trailer brake gain. Upon completion of block 308, processing returns to block 302.

At block 310, described in further detail in conjunction with FIG. 4, in response to determining the status of the vehicle 102 has changed and that the trailer 104 is attached to the vehicle 102, the trailer brake gain calibrator 112 is to determine a calibrated value of trailer brake gain based upon hitch force values received from the vehicle communication network 110. Additionally, in some examples, the trailer brake gain calibrator 112 may determine that the trailer brake gain calibration could not be completed.

At block 312, the gain adjustment manager 230 determines if the trailer brake gain calibration of block 310 was completed. In response to determining the trailer brake gain calibration of block 310 was completed, processing proceeds to block 314 where the gain adjustment manager 230 is further to set the determined trailer brake gain value as the calibrated trailer brake gain value. Alternatively, in response to determining the trailer brake gain calibration of block 310 was not completed, processing proceeds to block 308.

At block 316, the gain calibration initializer 220 determines if it is desired to recalibrate the trailer brake gain. In response to determining it is desired to recalibrate the trailer brake gain, processing returns to block 302 of the example method 300 of FIG. 3. Alternatively, in response to determining that it is not desired to recalibrate the trailer brake gain, the example method 300 of FIG. 3 ends.

An example method that may be executed to calibrate the trailer brake gain value (FIG. 3, block 310) is illustrated in FIG. 4. With reference to the preceding figures and associated descriptions, the example method of FIG. 4 begins execution at block 402 at which the gain calibration initializer 220 sets the trailer brake gain to an initial value. In some examples, the initial gain value is based upon a previously calibrated gain value. Additionally or alternatively, the initial gain value is an average of two or more previously calibrated gain values. Additionally or alternatively, the initial gain value is a midpoint of the possible range of gain values (i.e., the initial gain is 3 if the possible range is 1 to 5).

At block 404, the gain calibration initializer 220 determines if the vehicle 102 is in drive based upon vehicle status information received at the data interface 218 from the vehicle communication network 110. In response to determining that the vehicle 102 is in drive, processing transfers to block 406. Alternatively, in response to determining that the vehicle 102 is not in drive, processing transfers to block 416.

At block 406, in response to determining the vehicle 102 is in drive, the gain calibration initializer 220 is further to determine if the vehicle 102 is traveling at a speed less than or equal to a speed threshold (e.g., 25 miles per hour, 45 kilometers per hour, etc.) based upon vehicle status information received at the data interface 218 from the vehicle communication network 110. In response to determining that the speed of the vehicle 102 is less than or equal to the threshold, processing transfers to block 408. Alternatively, in response to determining that the speed of the vehicle 102 is greater than the threshold, processing transfers to block 416.

At block 408, described in further detail in conjunction with FIG. 5, in response to determining that the vehicle 102 is in drive and the speed of the vehicle 102 is less than a threshold, the trailer brake gain calibrator 112 is to determine the derivative of hitch force (e.g., dHf/dT).

At block 410, utilizing the absolute value of dHf/dT calculated at block 408, the gain adjustment manager 230 is further to determine whether the absolute value of dHf/dT increased (e.g., determine if the second derivative of hitch force is positive or negative). In response to the absolute value of dHf/dT increasing or remaining substantially identical (i.e., equal within a tolerance), processing transfers to block 412. Alternatively, in response to the absolute value of dHf/dT decreasing, processing transfers to block 414.

At block 412, in response to the absolute value of dHf/dT increasing or remaining identical within a tolerance, the gain adjustment manager 230 is further to increase the trailer brake gain from its previous value. In some examples, the amount the trailer brake gain value is increased is based upon the absolute value of dHf/dT. Additionally or alternatively, the amount the trailer brake gain value is increased is a constant value. Upon completion of the modulation of the trailer brake gain value, processing transfers to block 404 where, in response to the vehicle 102 being in drive and the speed of the vehicle 102 being less than or equal to the threshold, the method of block 312 iterates through each of block 408 and block 410.

At block 414, in response to the absolute value of dHf/dT decreasing, the gain adjustment manager 230 is further to decrease the trailer brake gain from its previous value. In some examples, the amount the trailer brake gain value is decreased is based upon the absolute value of dHf/dT. Additionally or alternatively, the amount the trailer brake gain value is decreased is a constant value.

At block 416, in response to determining the vehicle 102 is not in drive at block 404 and/or in response to determining the speed of the vehicle 102 is not within a threshold at block 406, the gain adjustment manager 230 is to determine the trailer brake gain is not to be modulated (e.g., adjusted). Upon completion of at least one of the block 414 and the block 416, processing returns to block 312 of the example method 300 of FIG. 3.

An example method that may be executed to modulate the trailer brake gain (FIG. 4, block 408) is illustrated in FIG. 5. With reference to the preceding figures and associated descriptions, the example method of FIG. 5 begins execution at block 502 at which the brake pressure applicator 222 applies a pressure to the braking systems 109 based upon a received trailer brake gain value. In some examples, the trailer brake gain value is an initial trailer brake gain value received from the gain calibration initializer 220 (set at block 402 of FIG. 4). Additionally or alternatively, the trailer brake gain value is a calculated trailer brake gain value received from the gain adjustment manager 230 (set at one of block 412 or block 414 of FIG. 4).

At block 504, in response to the pressure having been applied to the braking systems 109 at block 502, the hitch force manager 224 is to retrieve a hitch force from the data interface 218, wherein the data interface 218 received the hitch force from the electronic braking system 204 included in the vehicle communication network 110. The hitch force manager 224 is also to receive a timestamp associated with the hitch force.

At block 506, the hitch force manager 224 is further to retrieve a hitch force from the parameter storer 226, wherein said hitch force occurred prior to the hitch force retrieved at block 504. In some examples, the hitch force retrieved from the parameter storer 226 occurred in a previous iteration of the trailer brake gain modulation algorithm (FIG. 4, block 406).

At block 508, the hitch force derivative calculator 228 is to calculate dHf/dT based upon the two hitch forces received from the hitch force manager 224. In some examples, dHf/dT is calculated by dividing the force difference between the two hitch forces by the difference in time between the timestamps associated with the two hitch forces.

At block 510, the hitch force derivative calculator 228 is further to calculate the absolute value (e.g., the magnitude) of dHf/dT based upon the value of dHf/dT calculated at block 508. Upon completion of block 510, processing returns to block 410 of the example method 312 of FIG. 4.

Figure 6:
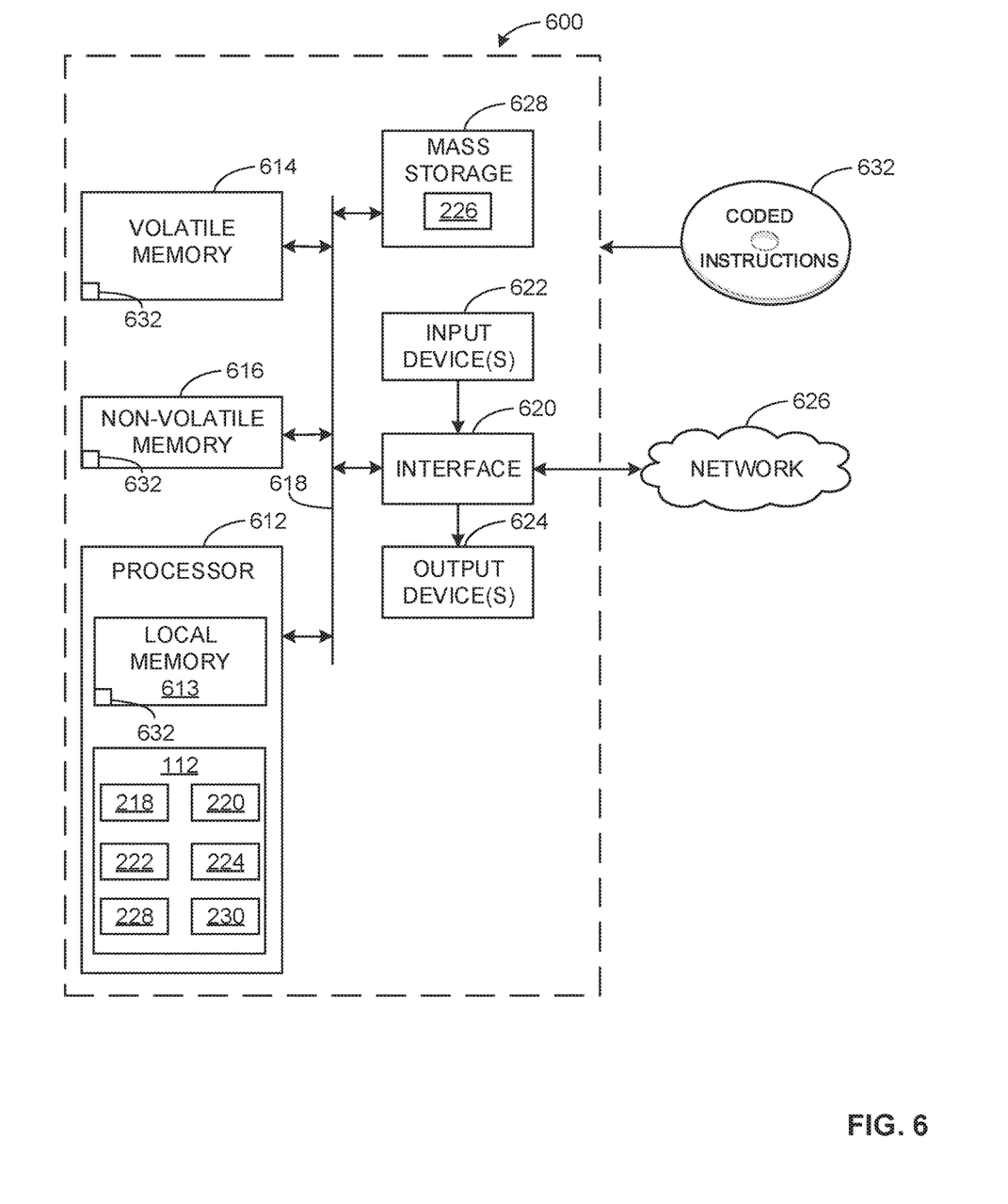
FIG. 6 is a block diagram of an example processing platform structured to execute machine readable instructions to implement the methods of FIGS. 3-5 and the example trailer brake gain calibrator of FIGS. 1 and/or 2.

FIG. 6 is a block diagram of an example processor platform 600 capable of executing instructions to implement the methods of FIGS. 3-5 to implement the apparatus of FIG. 2. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example data interface 218, the example gain calibration initializer 220, the example brake pressure applicator 222, the example hitch force manager 224, the example hitch force derivative calculator 228, and the example gain adjustment manager 230.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives. In the illustrated example of FIG. 6, the one or more mass storage devices 628 is further to implement the parameter storer 226.

The machine executable instructions 632 to implement the methods of FIGS. 3-5 may be stored in the mass storage device 628, in the volatile memory 614, in the non-volatile memory 616, and/or on a removable non-transitory computer readable storage medium such as a CD or DVD.

From the foregoing, it will be appreciated that example methods, apparatus and articles of manufacture have been disclosed that automatically calibrate a trailer brake gain to be used to apply a pressure to brakes of a trailer unit. Automatically calibrating this value decreases the time a user of the vehicle must spend calibrating the trailer brake gain in addition to ensuring that the trailer brake gain value is consistently set to a proper value.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:
1. An apparatus comprising:
a hitch force derivative calculator to calculate a derivative of a hitch force of a trailer coupled to a vehicle;
a gain adjustment manager to adjust a gain value based upon the derivative of the hitch force;
a brake pressure applicator to apply a pressure to a brake of the trailer based on the gain value; a data interface to receive status information of the vehicle, the status information including at least one of anti-lock brake data, traction control data, vehicle stability control data, moisture data, temperature data, hitch force data, or key cycle data; and a gain calibration initializer to initialize adjustment of the gain value based upon the status information of the vehicle.

2. The apparatus of claim 1, wherein the gain adjustment manager is further to increase the gain value when an absolute value of the derivative of the hitch force increases and decrease the gain value when the absolute value of the derivative of the hitch force decreases.

3. The apparatus of claim 2, wherein the gain adjustment manager is further to set the gain value as a calibrated gain value when the gain value decreases.

4. The apparatus of claim 3, wherein the gain adjustment manager is further to distribute a gain calibrated notification and the calibrated gain value to a user notifier when the gain value is set as the calibrated gain value.

5. The apparatus of claim 1, further including a parameter storer to store at least one of the hitch force, the derivative of the hitch force, or the gain value.

6. The apparatus of claim 5, wherein the derivative of the hitch force is calculated utilizing a first hitch force received from a hitch force manager and a second hitch force retrieved from the parameter storer, wherein the second hitch force occurred prior to the first hitch force.

7. An apparatus comprising:
a trailer brake gain calibrator programmed to modulate a trailer brake gain value based upon a derivative of a trailer hitch force and apply a pressure to a brake of a trailer based on the gain value; and initialize a gain calibration routine based on status information of a vehicle including at least one of anti-lock brake data, traction control data, vehicle stability control data, moisture data, temperature data, hitch force data, or key cycle data.

8. The apparatus of claim 7, wherein the trailer brake gain calibrator is further programmed to increase the gain value when an absolute value of the derivative of the trailer hitch force increases and decrease the gain value when the absolute value of the derivative of the trailer hitch force decreases.

9. The apparatus of claim 8, wherein the trailer brake gain calibrator is further programmed to set the gain value as a calibrated gain value when the gain value decreases.

10. The apparatus of claim 9, wherein the trailer brake gain calibrator is further programmed to distribute a gain calibrated notification and the calibrated gain value to a user when the calibrated gain value is set.

11. The apparatus of claim 7, wherein the trailer brake gain calibrator is further programmed to store at least one of the trailer hitch force, the derivative of the hitch force, or the gain value.

12. The apparatus of claim 7, wherein the derivative of the hitch force is calculated utilizing a first hitch force and a second hitch force, wherein the second hitch force occurred a period of time before the first hitch force.

13. A method comprising:
calculating a derivative of a hitch force;
adjusting a gain value based upon the derivative of the hitch force;
modulating a pressure applied to a trailer brake based upon the gain value; and initializing a gain calibration routine based upon status information of a vehicle, wherein the status information of the vehicle further includes at least one of anti-lock brake data, traction control data, vehicle stability control data, moisture data, temperature data, hitch force data, or key cycle data.

14. The method of claim 13, further including increasing the gain value in response to an absolute value of the derivative of the hitch force increasing and decreasing the gain value in response to the absolute value of the derivative of the hitch force decreasing.

15. The method of claim 14, further including setting the gain value as a calibrated gain value in response to the gain value decreasing.

16. The method of claim 13, further including storing at least one of the hitch force, the derivative of the hitch force, or the gain value.

17. The method of claim 13, wherein calculating the derivative of the hitch force further includes utilizing a first hitch force and a second hitch force, wherein the second hitch force occurred prior to the first hitch force.

* * * * *

UNITED STATES PATENT AND TRADEMARK OFFICE
CERTIFICATE OF CORRECTION

PATENT NO. : 10,703,345 B2  
APPLICATION NO. : 15/878008  
DATED : July 7, 2020  
INVENTOR(S) : Andrew Niedert et al.

Page 1 of 1

It is certified that error appears in the above-identified patent and that said Letters Patent is hereby corrected as shown below:

In the Claims

Column 15, Line 29 Claim 7: Replace "to modulate" with --to: modulate--

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*